(12) United States Patent
Utsunomiya et al.

(10) Patent No.: US 10,894,557 B2
(45) Date of Patent: Jan. 19, 2021

(54) STEERING COLUMN STRUCTURE

(71) Applicants: FURUKAWA ELECTRIC CO., LTD., Tokyo (JP); FURUKAWA AUTOMOTIVE SYSTEMS INC., Shiga (JP)

(72) Inventors: Hirofumi Utsunomiya, Inukami-gun (JP); Masatoshi Ushiyama, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 63 days.

(21) Appl. No.: 16/106,868

(22) Filed: Aug. 21, 2018

(65) Prior Publication Data

US 2018/0354544 A1    Dec. 13, 2018

Related U.S. Application Data

(63) Continuation of application No. PCT/JP2017/004843, filed on Feb. 10, 2017.

(30) Foreign Application Priority Data

Feb. 22, 2016 (JP) .................... 2016-031061

(51) Int. Cl.
*B62D 1/16* (2006.01)
*F16J 1/00* (2006.01)
(Continued)

(52) U.S. Cl.
CPC .............. *B62D 1/16* (2013.01); *B60R 16/027* (2013.01); *B62D 1/04* (2013.01); *F16J 1/00* (2013.01); *H01R 39/00* (2013.01)

(58) Field of Classification Search
CPC .......... B62D 1/04; B62D 1/16; B60R 16/027; B60R 2021/01006; B60R 21/017;
(Continued)

(56) References Cited

U.S. PATENT DOCUMENTS 4,578,592 A * 3/1986 Nakazawa ............. B60K 37/06
 180/78
4,598,602 A * 7/1986 Kurata ................... B60R 16/027
 74/484 R
(Continued)

FOREIGN PATENT DOCUMENTS

CN     102823081 A    12/2012
DE     3114410 A1    10/1982
(Continued)

OTHER PUBLICATIONS

International Search Report, issued in PCT/JP2017/004843, PCT/ISA/210, dated Apr. 11, 2017.
(Continued)

*Primary Examiner* — Laura Freedman
(74) *Attorney, Agent, or Firm* — Birch, Stewart, Kolasch & Birch, LLP

(57) ABSTRACT

A steering column structure includes a rotary connector, a steering column cover, and a steering lower cover attached with a gap defined between the steering lower cover and the steering column cover. The steering column cover includes a first side wall portion defining the gap, and a first insertion hole that is disposed in the first side wall portion and into which the rotary connector is inserted. The steering lower cover includes a second side wall portion facing the first side wall portion and defining the gap together with the first side wall portion, and a second insertion hole that is disposed in the second side wall portion and into which the rotary connector is inserted. The first side wall portion includes a (Continued)

first dam portion disposed in a position corresponding to the rotary connector above the rotary connector.

11 Claims, 7 Drawing Sheets

(51) Int. Cl.
    *B62D 1/04*           (2006.01)
    *B60R 16/027*      (2006.01)
    *H01R 39/00*       (2006.01)

(58) Field of Classification Search
    CPC ...... B60R 21/203; B60R 21/2035; F16J 1/00; H01R 39/00
    See application file for complete search history.

(56) References Cited

U.S. PATENT DOCUMENTS

| | | | | |
|---|---|---|---|---|
| 4,616,224 | A * | 10/1986 | Reighard | B60K 35/00 307/10.1 |
| 4,903,988 | A * | 2/1990 | Jambor | B62D 1/04 180/271 |
| 5,139,281 | A * | 8/1992 | Dzioba | B60R 16/027 280/731 |
| 6,147,416 | A * | 11/2000 | Mitsuzuka | B60R 16/027 200/61.54 |
| 6,796,801 | B2 * | 9/2004 | Hayashi | B60R 16/027 439/15 |
| 8,758,024 | B2 * | 6/2014 | Adachi | H01R 35/04 439/15 |
| 8,808,016 | B2 * | 8/2014 | Adachi | B60R 16/027 439/164 |
| 8,911,239 | B2 * | 12/2014 | Yamaguchi | B60R 16/027 439/15 |
| 8,998,628 | B2 * | 4/2015 | Hirai | H01R 35/04 439/15 |
| 10,199,786 | B2 * | 2/2019 | Yamashita | H01R 35/04 |
| 10,384,663 | B2 * | 8/2019 | Yamada | H01T 19/00 |
| 10,439,348 | B2 * | 10/2019 | Hirai | H01R 35/04 |
| 2013/0095672 | A1 | 4/2013 | Hirai | |
| 2014/0235082 | A1 * | 8/2014 | Adachi | B60R 16/027 439/164 |
| 2019/0118738 | A1 * | 4/2019 | Ushiyama | B62D 1/04 |
| 2019/0131749 | A1 * | 5/2019 | Utsunomiya | H01R 35/025 |
| 2019/0207352 | A1 * | 7/2019 | Ushiyama | H01R 35/025 |
| 2019/0221979 | A1 * | 7/2019 | Hirai | H01R 35/04 |

FOREIGN PATENT DOCUMENTS

| | | | | |
|---|---|---|---|---|
| EP | 2555344 A1 | 2/2013 | | |
| JP | 5-32222 U | 4/1993 | | |
| JP | 11185917 A | * 7/1999 | | |
| JP | 2000150275 A | * 5/2000 | ........... | B60R 16/027 |
| JP | 2011-199349 A | 7/2001 | | |
| JP | 2001-332432 A | 11/2001 | | |
| JP | 2011-228191 A | 11/2011 | | |
| WO | WO 2011/122469 A1 | 10/2011 | | |

OTHER PUBLICATIONS

Written Opinion of the International Searching Authority, issued in PCT/JP2017/004843, PCT/ISA/237, dated Apr. 11, 2017.
Extended European Search Report, dated Sep. 16, 2019, for European Application No. 17756227.9.
Korean Office Action, dated Sep. 27, 2019, for Korean Application No. 10-2018-7021013, with an English translation.
English Translations of the International Preliminary Report on Patentability and Written Opinion of the International Searching Authority(Forms PCT/IB/373 and PCT/ISA/237), dated Aug. 28, 2018, for International Application No. PCT/JP2017/004843.
Korean Office Action, dated Dec. 9, 2019; for Korean Application No. 10-2016-7021013, with an English translation.
Office Action dated Mar. 24, 2020 in corresponding Chinese Patent Application No. 201780007581.3, with English translation.
Office Action dated Aug. 31, 2020 in corresponding Japanese Patent Application No. 2018-501563, with English translation.
Office Action dated Oct. 28, 2020 in corresponding Chinese Patent Application No. 201780007581.3 (with English translation).

* cited by examiner

STEERING COLUMN STRUCTURE

CROSS REFERENCE TO RELATED APPLICATIONS

This is a continuation application of International Patent Application No. PCT/JP2017/004843 filed Feb. 10, 2017, which claims the benefit of Japanese Patent Application No. 2016-031061, filed Feb. 22, 2016, the full contents of both of which are hereby incorporated by reference in their entirety.

BACKGROUND

Technical Field

The present disclosure relates to steering column structures mounted in vehicles, and more particularly, to a steering column structure in which a rotary connector is housed.

Background

A vehicle, such as a four-wheel automobile, is equipped with a rotary connector (SRC) disposed at a portion of linking of a steering wheel with a steering shaft and supplying power to an air bag apparatus and the like. The rotary connector is attached surrounding a steering shaft, and the rotary connector and an end portion of the steering shaft are housed in a steering column cover. Furthermore, a boss portion of the steering wheel is housed in a steering lower cover disposed on the steering wheel side.

In the above steering cover structure, the steering column cover does not rotate when the steering wheel is turned; in contrast, the steering lower cover is integrally fixed to the steering wheel and rotates as the steering wheel is turned. The steering column cover and the steering lower cover are arranged with a predetermined interval therebetween in the axial direction of the steering shaft in order to prevent these covers from interfering with each other when the steering wheel is turned.

With the above configuration, if, for example, a driver splashes liquid, such as a beverage, onto the steering lower cover by mistake, or if condensation occurs on an upper wall portion of the steering lower cover, the liquid may flow into a gap between the steering lower cover and the steering column cover and reach the rotary connector. Then, the liquid may enter the rotary connector and cause "green rust" on a portion of connection between a primary mold bus bar and a flexible flat cable (FFC) disposed in the rotary connector. Water, salt, or the like contained in the liquid may cause "green rust" on a conductor portion disposed at a connector portion (contact) of the rotary connector for connection with an external device, and an electrical resistance value may be increased to exceed an electrical resistance value in the specification in electrification of the rotary connector, resulting in malfunction of the external device, such as an air bag.

In the related art, to prevent drinking water or the like from entering a rotary connector including a stationary case (stator), a rotary case (rotator) rotatably joined to the stationary case, and a flexible flat cable (FFC) housed in a wound-around manner in an annular inner space defined by the stationary case and the rotary case, a structure is proposed that has a gap defined between the rotary case and the stationary case and open vertically downward (JP 5-32222 UM-A).

Unfortunately, the above known technique proposes the rotary connector structure with which liquid or the like is unlikely to enter the rotary connector on the assumption that liquid is splashed onto the rotary connector, but does not propose a steering cover structure, such as a steering column cover and a steering lower cover. Especially, in the rotary case of the rotary connector, a rotary case post portion in which (1) a connector portion connected with cables coming out from switches of the steering wheel and (2) a lead cable with a connector for air bag connection connected with an electric circuit of an air bag apparatus or the like attached to the steering wheel are assembled is disposed. The rotary case post portion is provided with a fitting groove and a lock hole for placing and fixing the lead cable with a connector for air bag connection in and to this post portion, so that liquid reaching the rotary case post portion accumulates in the fitting groove and the lock hole. The liquid then reaches the portion of connection between the primary mold bus bar and the FFC disposed in the rotary connector as the rotary case performs rotary motion or the like, and may cause green rust on the connecting portion. Therefore, to prevent liquid from reaching the rotary connector even if a driver splashes liquid, such as a beverage, onto the steering lower cover by mistake, measures are required to be taken for the steering column structure.

The present disclosure is related to providing a steering column structure capable of preventing liquid from reaching a rotary connector so as to prevent green rust from occurring in the rotary connector to prevent an increase in an electrical resistance value of the rotary connector.

SUMMARY

According to an aspect of the present disclosure, a steering column structure includes: a rotary connector attached to an end portion of a steering shaft in a surrounding manner; a steering column cover configured to house the end portion of the steering shaft; and a steering lower cover configured to house a central portion of a steering wheel connected with the end portion of the steering shaft, the steering lower cover being attached with a gap defined between the steering lower cover and the steering column cover in an axial direction of the steering shaft. The steering column cover includes a first side wall portion defining the gap, and a first insertion hole disposed in the first side wall portion, the rotary connector being inserted into the first insertion hole. The steering lower cover includes a second side wall portion facing the first side wall portion and defining the gap together with the first side wall portion, and a second insertion hole disposed in the second side wall portion, the rotary connector being inserted into the second insertion hole. At least one of the first side wall portion of the steering column cover and the second side wall portion of the steering lower cover includes a first dam portion disposed in a position above the rotary connector and corresponding to the rotary connector The first dam portion has a length equivalent to an outer diameter of the rotary connector and corresponding to a radial direction of the rotary connector.

The first dam portion extends along a periphery of at least one of the first insertion hole and the second insertion hole.

The first dam portion may be a protrusion portion disposed on one of the first side wall portion and the second side wall portion and protruding toward the other of the first side wall portion and the second side wall portion.

The protrusion portion disposed on one of the first side wall portion and the second side wall portion may be inserted into the first insertion hole or the second insertion hole of the other of the first side wall portion and the second side wall portion.

The first dam portion may be a groove portion disposed in one of the first side wall portion and the second side wall portion.

The rotary connector includes a stationary case and a rotary case rotatably joined to the stationary case, and is arranged so that the rotary case is positioned on a side closer to the steering wheel; and the rotary case includes an upper end surface positioned on an upper side in the axial direction of the steering shaft with respect to the second side wall portion of the steering lower cover.

The rotary connector may include a slide surface in an in-plane direction orthogonal to the axial direction of the rotary connector, the stationary case and the rotary case sliding on the slide surface, and the slide surface may be positioned on an upper side in the axial direction of the steering shaft with respect to the second side wall portion of the steering lower cover.

The rotary connector further includes a rotary case post portion disposed on the upper end surface of the rotary case, and with the steering wheel in a neutral position, the rotary case post portion is in a 6 o'clock position on the rotary connector.

According to the present disclosure, the steering column cover includes the first side wall portion that defines the gap, and the first insertion hole that is disposed in the first side wall portion and into which the rotary connector is inserted. The steering lower cover includes the second side wall portion that faces the first side wall portion and defines the gap together with the first side wall portion, and the second insertion hole that is disposed in the second side wall portion and into which the rotary connector is inserted. At least one of the first side wall portion of the steering column cover and the second side wall portion of the steering lower cover includes the first dam portion disposed in a position above the rotary connector and corresponding to the rotary connector. Thus, even if liquid, such as a beverage carelessly splashed onto the steering column structure by a driver and water produced by condensation, enters the gap between the steering column cover and the steering lower cover, the first dam portion of the first side wall portion can interrupt the liquid. Consequently, the liquid can be prevented from reaching the rotary connector, and green rust is thus prevented from occurring in the rotary connector to prevent an increase in an electrical resistance value of the rotary connector.

Since the first dam portion extends along the periphery of the first insertion hole and extends over a length equivalent to the diameter of the rotary connector, the liquid can be reliably prevented from reaching the rotary connector.

The upper end surface of the rotary case of the rotary connector is positioned on the upper side in the axial direction of the steering shaft with respect to the second side wall portion of the steering lower cover. Thus, even if the liquid entering the gap flows along the second side wall portion, the liquid is unlikely to reach the rotary case post portion disposed on the upper end surface of the rotary case and does not accumulate in a fitting groove and a lock hole disposed in the rotary case post portion. Consequently, green rust can be reliably prevented from occurring in the rotary connector.

Furthermore, since the slide surface on which the stationary case and the rotary case of the rotary connector slide is positioned on the upper side in the axial direction of the steering shaft with respect to the second side wall portion of the steering lower cover, the liquid can be reliably prevented from accumulating in the fitting groove and the lock hole disposed in the rotary case post portion. The liquid is also unlikely to reach the slide surface and can be prevented from entering the rotary connector along the slide surface, so that green rust can be reliably prevented from occurring in the rotary connector.

DETAILED DESCRIPTION

An embodiment of the present disclosure will be described in detail below with reference to the drawings.

Figure 1:
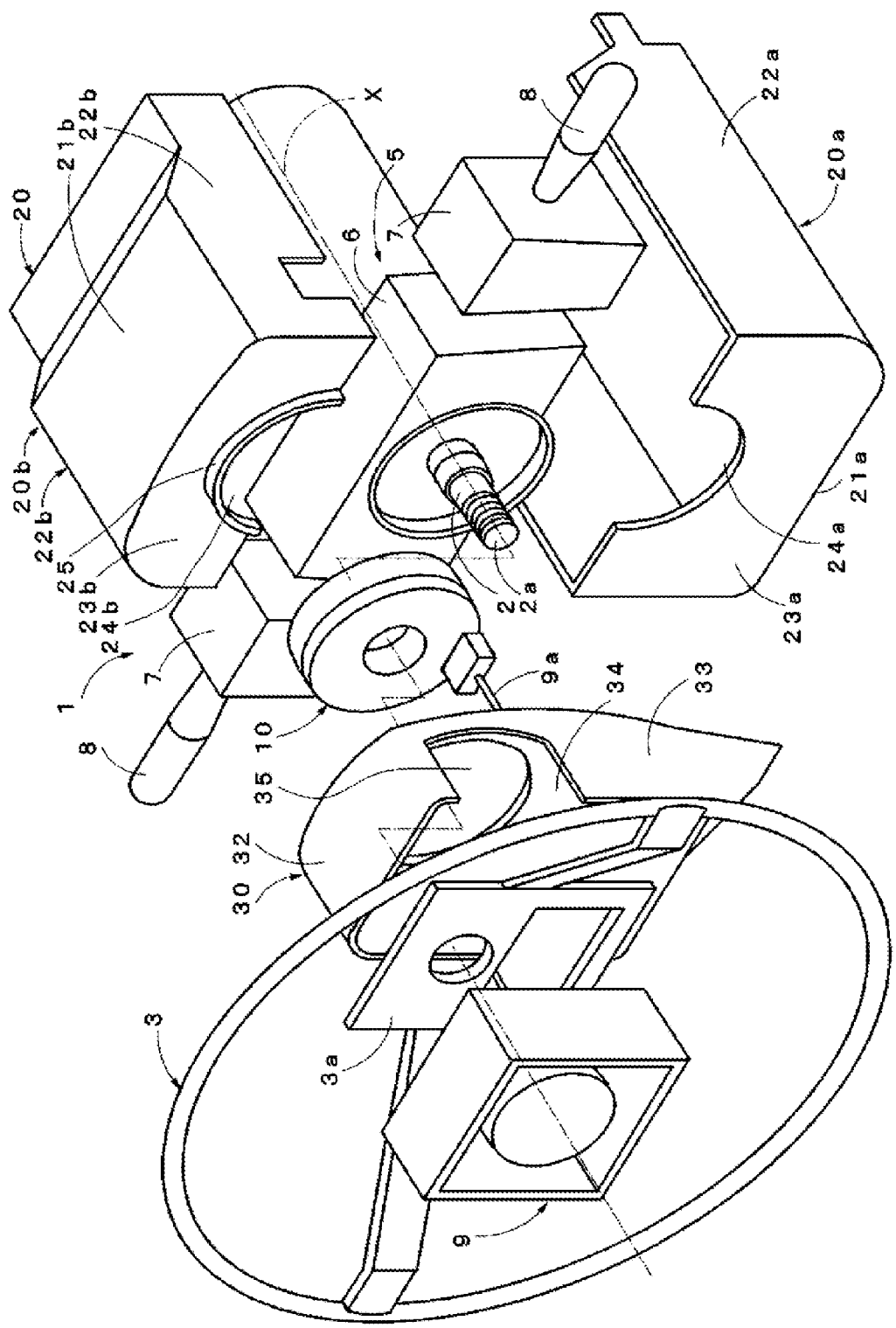
FIG. 1 is a schematic exploded perspective view of a steering column structure according to an embodiment of the present disclosure.
Figure 2:
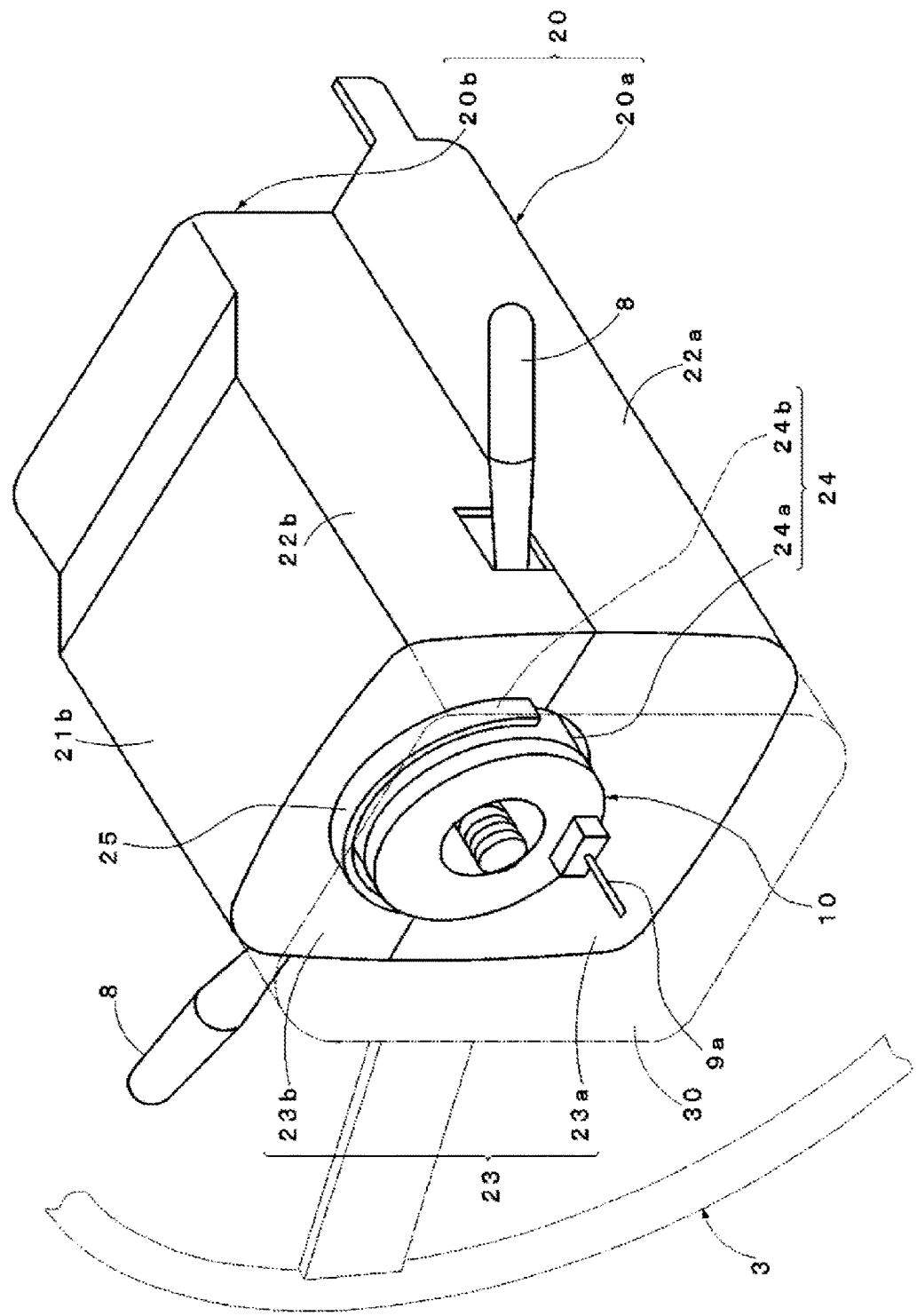
FIG. 2 is a perspective view of a configuration of a steering column cover illustrated in FIG. 1.

FIG. 1 is a schematic exploded perspective view of a configuration of a steering column structure according to the present embodiment. FIG. 2 is a perspective view of a configuration of a steering column cover illustrated in FIG. 1. Note that FIG. 1 illustrates an example of the steering column structure, and the example in FIG. 1 should not be construed to limit the configuration of the steering column structure according to the present disclosure.

In FIGS. 1 and 2, the steering column structure 1 includes a rotary connector 10 (SRC) that is attached to an end portion 2a of a steering shaft 2 in a surrounding manner, a steering column cover 20 that is configured to house the end portion 2a of the steering shaft 2, and a steering lower cover 30 that is configured to house a steering wheel support plate 3a positioned at a center portion of a steering wheel 3 connected with the end portion 2a of the steering shaft 2 and that is attached with a gap 4 (see FIG. 3) defined between the steering lower cover 30 and the steering column cover 20 in the axial direction of the steering shaft 2 (the X direction in the drawings).

A steering column module 5 is attached on the steering column cover 20 side of the rotary connector 10. The steering column module 5 includes a housing 6 pivotally and rotatably supporting the steering shaft 2, column switches 7, 7 disposed on both lateral sides of the housing 6, and levers 8, 8 attached to the column switches. An air bag apparatus 9 is attached to the steering wheel support plate 3a of the steering wheel 3 on the steering lower cover 30 side of the rotary connector 10.

Figure 3:
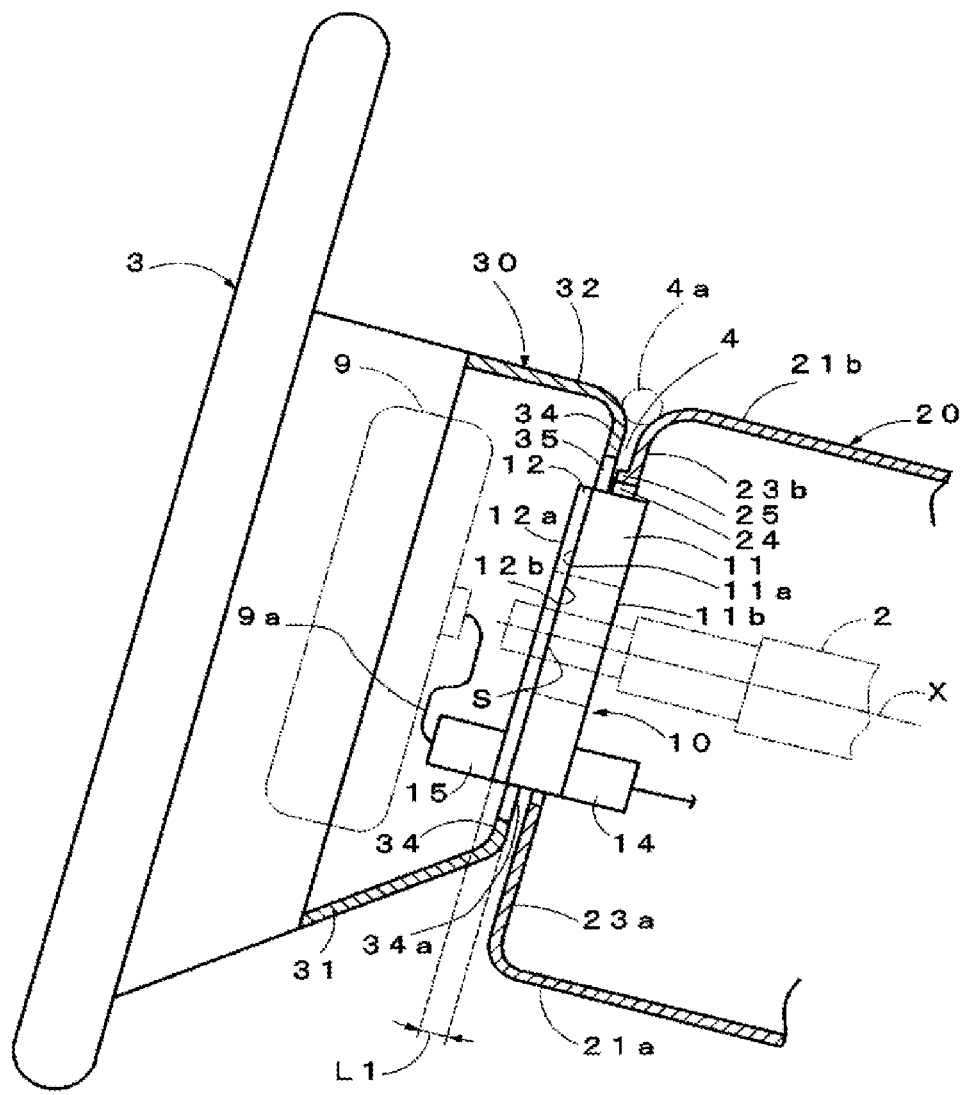
FIG. 3 is a partial cross-sectional view illustrating arrangement of a rotary connector in the steering column structure illustrated in FIG. 1.

The rotary connector 10 is disposed at a portion of linking of the steering wheel 3 with the steering shaft 2 and supplies power to the air bag apparatus 9 and the like through a cable 9a (see FIG. 3).

The steering column cover 20 is disposed housing the rotary connector 10 and an end portion 2b of the steering shaft 2. The steering lower cover 30 is disposed between the steering column cover 20 and the steering wheel 3 while housing the steering wheel support plate 3a of the steering wheel 3. The steering column cover 20 and the steering lower cover 30 constitute a steering cover structure.

The steering column cover 20 does not rotate when the steering wheel 3 is turned; in contrast, the steering lower cover 30 is integrally fixed to the steering wheel 3 and rotates as the steering wheel 3 is turned. The steering column cover 20 and the steering lower cover 30 are arranged with a predetermined interval therebetween in the axial direction of the steering shaft 2 to prevent interference with each other when the steering wheel 3 is turned.

As illustrated in FIG. 1, the steering column cover 20 is composed of a lower cover 20a and an upper cover 20b so as to be vertically divided into two.

The lower cover 20a includes a bottom wall portion 21a and a pair of side wall portions 22a, 22a extending in the axial direction of the steering shaft 2, a side wall portion 23a extending in the radial direction of the steering shaft 2 and defining the gap 4, and a semicircular notch portion 24a disposed in the side wall portion 23a. The bottom wall portion 21a, the pair of side wall portions 22a, 22a, and the side wall portion 23a are integrally molded from a resin, for example.

The upper cover 20b includes an upper wall portion 21b and a pair of side wall portions 22b, 22b extending in the axial direction of the steering shaft 2, a side wall portion 23b extending in the radial direction of the steering shaft 2 and defining the gap 4, and a semicircular notch portion 24b disposed in the side wall portion 23b. The upper wall portion 21b, the pair of side wall portions 22b, 22b, and the side wall portion 23b are integrally molded from a resin, for example.

The steering column cover 20 can be vertically divided into two in the present embodiment; however, no such limitation is intended, and the steering column cover 20 may be formed as a single unit.

With the lower cover 20a and the upper cover 20b fitted to each other (FIG. 2), the steering column cover 20 includes a first side wall portion 23 that defines the gap 4 and a circular first insertion hole 24 that is disposed in the first side wall portion 23 and into which the rotary connector 10 is inserted. That is, the first side wall portion 23 is constituted by the side wall portions 23a, 23b, and the first insertion hole 24 is constituted by the notch portions 24a, 24b.

The steering lower cover 30 includes an upper wall portion 32, a pair of side wall portions 33, 33 that extends in the axial direction of the steering shaft 2, a second side wall portion 34 that faces the first side wall portion 23 and defines the gap 4 together with the first side wall portion 23, and a circular second insertion hole 35 that is disposed in the second side wall portion 34 and into which the rotary connector 10 is inserted. The upper wall portion 32, the pair of side wall portions 33, 33, and the second side wall portion 34 are integrally molded from a material containing a resin as the main component, for example.

The first side wall portion 23 of the steering column cover 20 includes a first dam portion 25 disposed in a position corresponding to the rotary connector 10 above the rotary connector. The "position corresponding to the rotary connector 10" refers to a position where the first dam portion 25 at least partially overlaps with the rotary connector 10 in a projected plane with the projection line coinciding with the inclining direction of the first side wall portion 23, for example. In the present embodiment, the first dam portion 25 has a length equivalent to the outer diameter of the rotary connector 10 and corresponding to the radial direction of the rotary connector, and extends along the periphery of the first insertion hole 24. In a case where the first insertion hole 24 is circular, the first dam portion 25 is shaped into a continuous arc having such a length that the central angle is from ±60° to ±90° with the vertical direction defined as 0°, for example. This configuration enables the first dam portion 25 to interrupt liquid, such as a beverage, unexpectedly entering the gap 4.

The first dam portion 25 is, for example, a protrusion portion protruding toward the second side wall portion 34 and integrated with the steering column cover 20. The protrusion portion is a long ridge having a round shape along the periphery of the first insertion hole 24. The protrusion portion may have any cross-sectional shape in the short direction capable of interrupting liquid flowing in the gap 4, for example, a rectangular or trapezoidal shape.

FIG. 3 is a partial cross-sectional view illustrating arrangement of the rotary connector 10 in the steering column structure 1 illustrated in FIG. 1. In this drawing, the rotary connector 10 includes a stationary case 11 (stator) and a rotary case 12 (rotator) rotatably joined to the stationary case 11, and is arranged so that the rotary case 12 is positioned on the steering wheel 3 side.

The rotary connector 10 further includes a connector portion 14 that is disposed on a lower end surface 11b of the stationary case 11 while extending toward the side opposite to the steering wheel 3 and that supplies power from a vehicle main body to the rotary connector 10, and a rotary case post portion 15 that is disposed on an upper end surface 12a of the rotary case 12 while extending toward the steering wheel 3 and that is adapted to be electrically connected with an external device, such as the air bag apparatus 9, through the cable 9a. The rotary case post portion 15 is provided with a fitting groove and a lock hole (not illustrated) for engagement with a cable connector attached to the cable 9a.

The rotary connector 10 includes a slide surface S in an in-plane direction orthogonal to the axial direction of the rotary connector (the X direction in the drawings), and an upper end surface 11a of the stationary case 11 and a lower end surface 12b of the rotary case 12 slide on the slide surface S.

The upper end surface 12a of the rotary case 12 is positioned on an upper side in the axial direction of the steering shaft 2 with respect to the second side wall portion 34 of the steering lower cover 30. In specific, the upper end surface 12a of the rotary case 12 is arranged remote from an outer surface 34a of the second side wall portion 34 of the steering lower cover 30 by a distance L1 in the axial direction of the steering shaft 2. Even if liquid entering the gap 4 flows along the first side wall portion 23, the rotary connector 10 arranged in the above position makes the liquid unlikely to reach the rotary case post portion 15 disposed on the upper end surface 12a of the rotary case 12, so that the liquid does not accumulate in the fitting groove and the lock hole disposed in the rotary case post portion 15.

Figure 4:
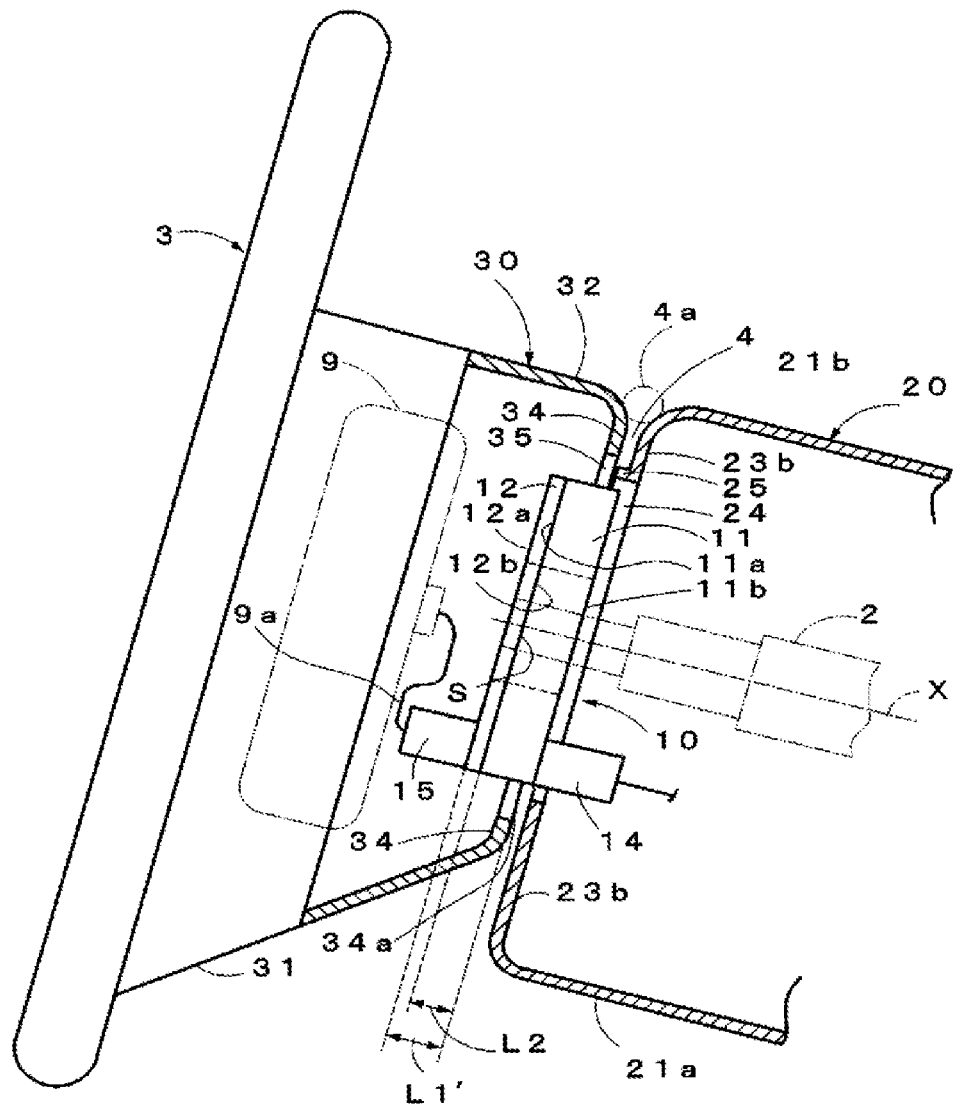
FIG. 4 is a partial cross-sectional view of a variation of the arrangement of the rotary connector illustrated in FIG. 3.

As illustrated in FIG. 4, the slide surface S on which the stationary case 11 and the rotary case 12 slide may be positioned on an upper side in the axial direction of the steering shaft 2 with respect to the second side wall portion 34 of the steering lower cover 30. In specific, the upper end surface 12a of the rotary case 12 may be arranged remote from the outer surface 34a of the second side wall portion 34 of the steering lower cover 30 by a distance L1' in the axial direction of the steering shaft 2, and the slide surface S may be arranged remote from the outer surface 34a of the second side wall portion 34 of the steering lower cover 30 by a distance L2 in the axial direction of the steering shaft 2. The rotary case 12 arranged in the above position can reliably prevent the liquid from accumulating in the fitting groove and the lock hole disposed in the rotary case post portion 15. Furthermore, the liquid is also unlikely to reach the slide surface S and can be prevented from entering the rotary connector 10 along the slide surface S.

With the steering wheel 3 in a neutral position, the connector portion 14 and the rotary case post portion 15 are in the 6 o'clock position on the rotary connector 10. The neutral position of the steering wheel 3 refers to a position in which the number of clockwise turns of the steering wheel 3 (for example, 1.5 to 2 turns) is equal to the number of counterclockwise turns (for example, 1.5 to 2 turns) with a predetermined number of turns from lock to lock (for example, 3 to 4 turns). The steering wheel 3 is normally in the neutral position, and when a driver turns the steering wheel in vehicle traveling, the rotary case post portion 15 rotates with the turning. In a case where the rotary case post portion is in the 12 o'clock position on the rotary connector 10 with the steering wheel 3 in the neutral position, liquid splashed onto the steering column structure 1 by the driver by mistake readily enters the rotary connector through the rotary case post portion. In the present embodiment, the rotary case post portion 15 is in the 6 o'clock position with the steering wheel 3 in the neutral position to ensure the maximum distance from an upper opening 4a of the gap 4 to the rotary case post portion 15, so that liquid entering through the upper opening 4a can be reliably prevented from reaching the rotary case post portion 15.

Figure 5:
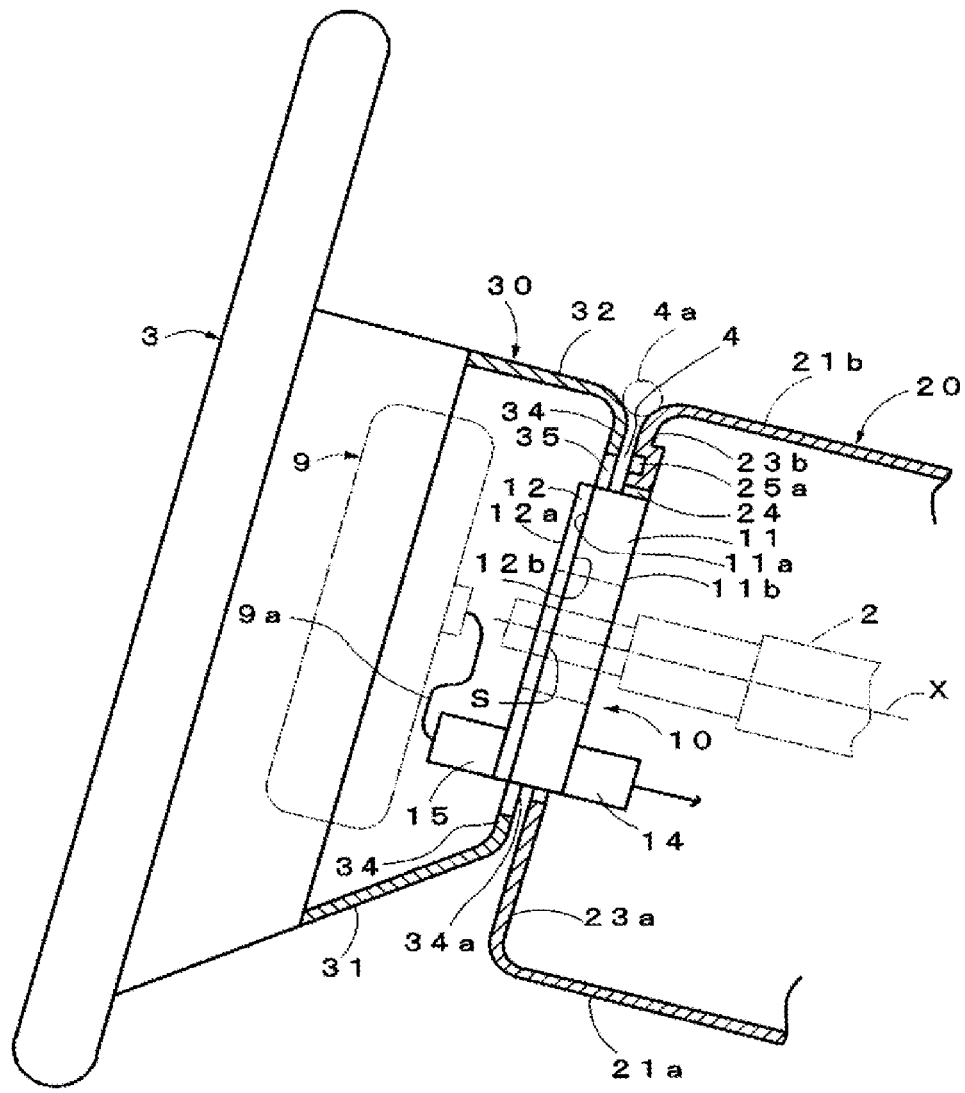
FIG. 5 is a partial cross-sectional view of a variation of a first dam portion of the steering column cover illustrated in FIG. 3.

FIG. 5 is a partial cross-sectional view of a variation of the first dam portion 25 of the steering column cover 20 illustrated in FIG. 3. The first dam portion 25 illustrated in FIG. 3 is the protrusion portion; however, no such limitation is intended, and as illustrated in FIG. 5, a first dam portion 25a may be a groove portion. This groove portion may extend along the periphery of the first insertion hole 24, or may have a length equivalent to the outer diameter of the rotary connector 10 and corresponding to the radial direction of the rotary connector. With this configuration, the groove portion interrupts liquid entering the gap 4. The groove portion extending along the periphery of the first insertion hole 24 can guide the liquid entering the gap 4 through the radially outer side of the rotary connector 10 to the lower side of the steering column cover 20. The liquid entering the gap 4 can thus be prevented from reaching the rotary connector 10.

Figure 6:
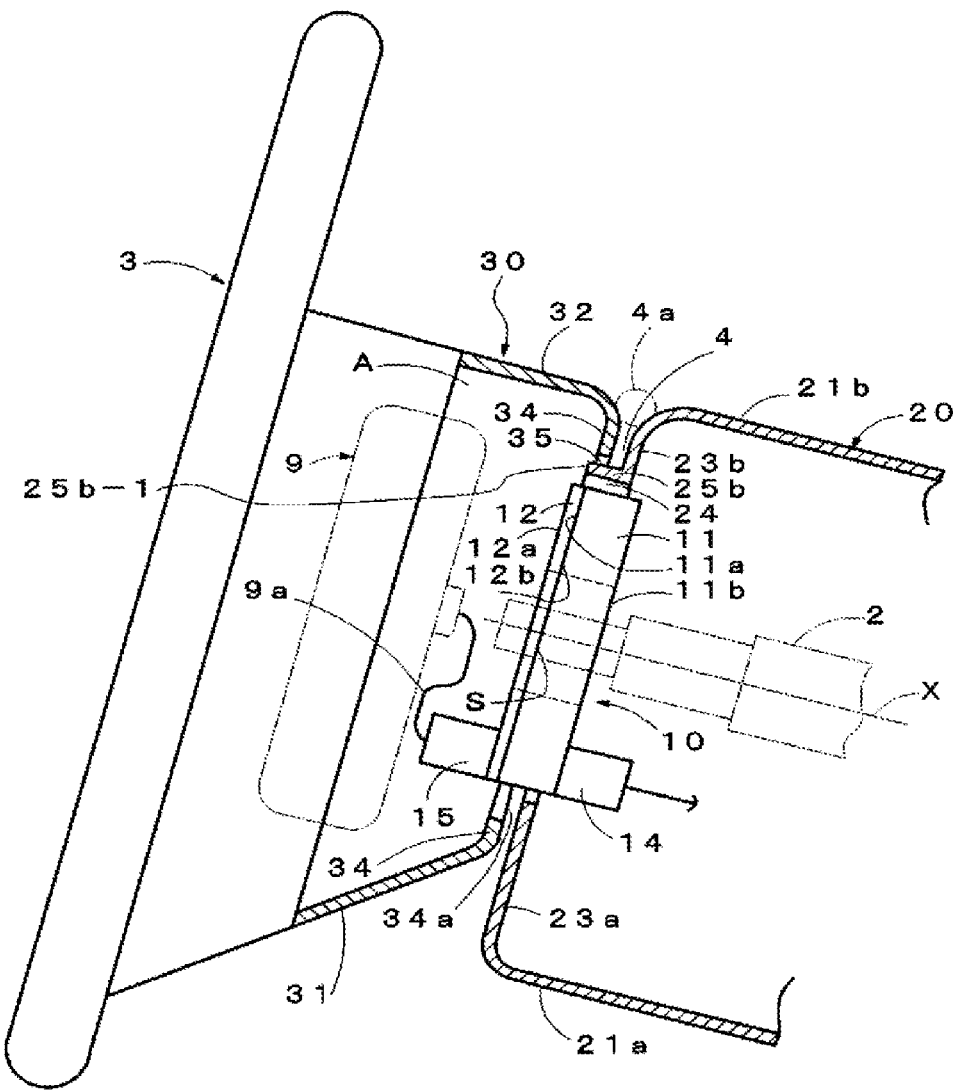
FIG. 6 is a partial cross-sectional view of another variation of the first dam portion of the steering column cover illustrated in FIG. 3.

FIG. 6 is a partial cross-sectional view of another variation of the first dam portion 25 illustrated in FIG. 3. The first dam portion 25 illustrated in FIG. 3 protrudes toward the second side wall portion 34, and a first dam portion 25b illustrated in FIG. 6 has a specified protruding height. Specifically, the first dam portion 25b may protrude toward the second side wall portion 34 with such a protruding height that the first dam portion 25b reaches at least the interior of the second insertion hole 35 of the steering lower cover 30. In this case, an end portion 25b-1 in the protruding direction of the first dam portion is positioned in the second insertion hole 35, or positioned closer to the steering wheel 3 with respect to the second insertion hole 35 in the axial direction of the steering shaft 2, that is, in an inner space A of the steering lower cover 30. In a case where the second insertion hole 35 is circular and the first dam portion 25b is arc-shaped, it is preferable that these components are arranged concentrically, the outer diameter of the first dam portion 25b is smaller than the hole diameter of the second insertion hole 35, and a predetermined clearance is defined between the second insertion hole 35 and the first dam portion 25b in the radial direction. With this configuration, the gap 4 above the rotary connector 10 has an L-shape in a cross-sectional view in the length direction of the steering column structure 1, and the path from the upper opening 4a of the gap 4 to the rotary connector 10 has a longer distance, so that the liquid entering the gap 4 can be reliably prevented from reaching the rotary connector 10.

As described above, according to the present embodiment, the steering column cover 20 includes the first side wall portion 23 that defines the gap 4 and the first insertion hole 24 that is disposed in the first side wall portion 23 and into which the rotary connector 10 is inserted. The steering lower cover 30 includes the second side wall portion 34 that faces the first side wall portion 23 and defines the gap 4 together with the first side wall portion 23, and the second insertion hole 35 that is disposed in the second side wall portion 34 and into which the rotary connector 10 is inserted. The first side wall portion 23 of the steering column cover 20 includes the first dam portion 25, 25a, 25b disposed in a position corresponding to the rotary connector 10 above the rotary connector. Thus, even if liquid, such as a beverage carelessly splashed onto the steering column structure 1 by a driver and water produced by condensation, enters the gap 4 between the steering column cover 20 and the steering lower cover 30, the first dam portion 25, 25a, 25b of the first side wall portion 23 can interrupt the liquid. Consequently, the liquid can be prevented from reaching the rotary connector 10, and green rust is thus prevented from occurring in the rotary connector 10 to prevent an increase in an electrical resistance value of the rotary connector. Especially, green rust can be prevented from occurring on a portion of connection between a primary mold bus bar and a flexible flat cable disposed in the rotary connector 10.

Since the first dam portion 25, 25a, 25b extends along the periphery of the first insertion hole 24 and extends over a length equivalent to the diameter of the rotary connector 10, the liquid can be reliably prevented from reaching the rotary connector 10.

The upper end surface 12a of the rotary case 12 of the rotary connector 10 is positioned on the upper side in the axial direction of the steering shaft 2 with respect to the second side wall portion 34 of the steering lower cover 30. Thus, even if the liquid entering the gap 4 flows along the first side wall portion 23, the liquid is unlikely to reach the rotary case post portion 15 disposed on the upper end surface 12a of the rotary case 12 and does not accumulate in the fitting groove and the lock hole disposed in the rotary case post portion 15. Consequently, green rust can be reliably prevented from occurring in the rotary connector 10.

Furthermore, since the slide surface S on which the stationary case 11 and the rotary case 12 of the rotary connector 10 slide is positioned on the upper side in the axial direction of the steering shaft 2 with respect to the second side wall portion 34 of the steering lower cover 30, the liquid can be reliably prevented from accumulating in the fitting groove and the lock hole disposed in the rotary case post portion 15. The liquid is also unlikely to reach the slide surface and can be prevented from entering the rotary connector 10 along the slide surface, so that green rust can be reliably prevented from occurring in the rotary connector 10.

Figure 7A:
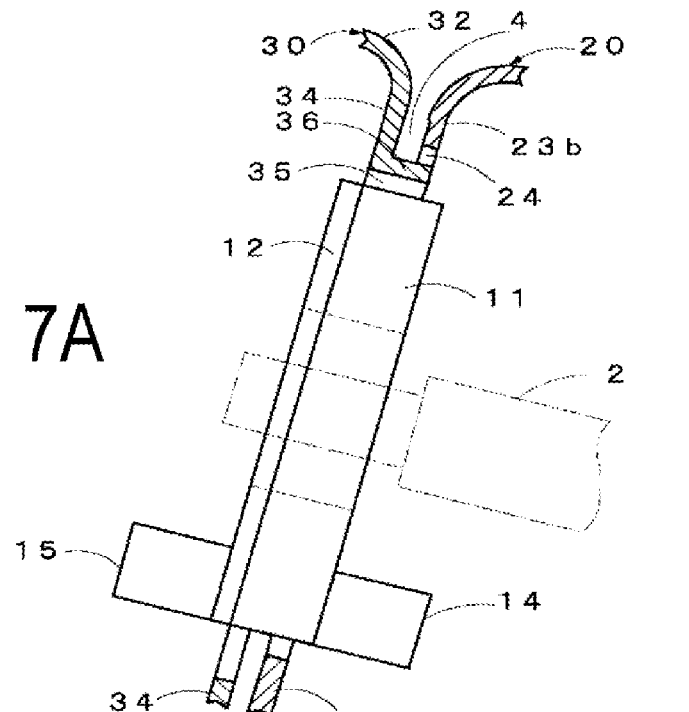
FIGS. 7A and 7B are partial cross-sectional views of a variation of the steering cover structure illustrated in FIG. 1.
Figure 7B:
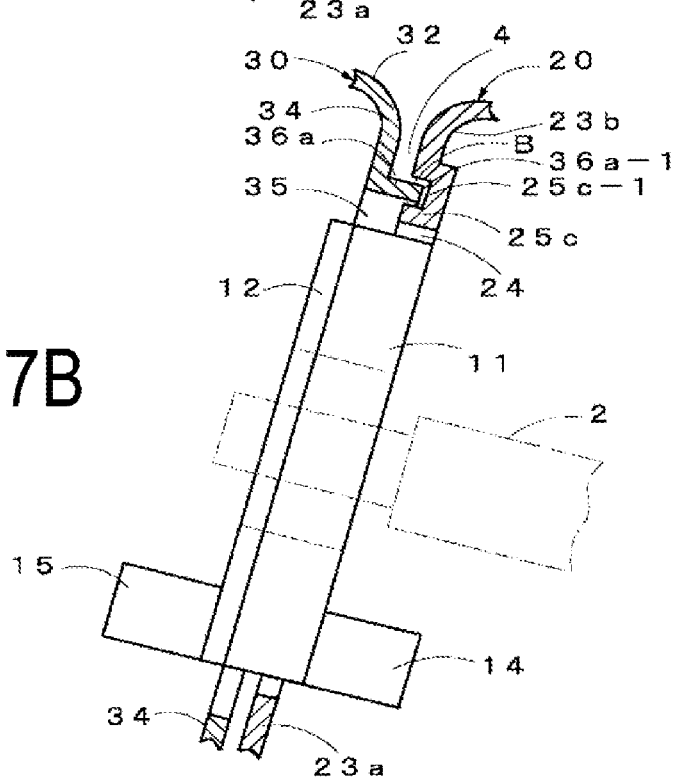

FIGS. 7A and 7B are partial cross-sectional views of a variation of the steering column structure 1 illustrated in FIG. 1. In the steering cover structure illustrated in FIG. 1, the steering column cover 20 includes the first dam portion 25. However, no such limitation is intended, and as illustrated in FIG. 7A, the steering lower cover 30 may include a first dam portion 36. In specific, the steering lower cover 30 includes the first dam portion 36 disposed in a position corresponding to the rotary connector 10 above the rotary connector. The first dam portion 36 may extend along the periphery of the second insertion hole 35, or may have a length equivalent to the outer diameter of the rotary connector 10 and corresponding to the radial direction of the rotary connector. The first dam portion 36 may protrude toward the side wall portion 23b with such a protruding height that the first dam portion 36 reaches at least the interior of the first insertion hole 24 of the steering column cover 20. In the case where the first insertion hole 24 is circular and the first dam portion 36 is arc-shaped, it is preferable that these components are arranged concentrically, the outer diameter of the first dam portion 36 is smaller than the hole diameter of the first insertion hole 24, and a predetermined clearance is defined between the first insertion hole 24 and the first dam portion 36 in the radial direction. Also with this configuration, the liquid entering the gap 4 can be reliably prevented from reaching the rotary connector 10.

As illustrated in FIG. 7B, the steering lower cover 30 may include a protrusion portion 36a (first dam portion) disposed in a position corresponding to the rotary connector 10 above the rotary connector, and the steering column cover 20 may include a groove portion 25c (another first dam portion) disposed in a position corresponding to the protrusion portion above the rotary connector 10. In this case, the protrusion portion 36a extends along the periphery of the second insertion hole 35, and the groove portion 25c extends along the periphery of the first insertion hole 24. An end portion 36a-1 in the protruding direction of the protrusion portion 36a protrudes toward an innermost surface 25c-1 of the groove portion 25c and is positioned in an inner space B of the groove portion 25c. In a case where the groove portion 25c is arc-shaped and the protrusion portion 36a is arc-shaped, it is preferable that these components are arranged concentrically, and a predetermined clearance is defined between the groove portion 25c and the protrusion portion 36a in the radial direction. With this configuration, the gap 4 above the rotary connector 10 has a U-shape in a cross-sectional view in the length direction of the steering column structure 1, and the path from the upper opening 4a of the gap 4 to the rotary connector 10 has an even longer distance, so that the liquid entering the gap 4 can be reliably prevented from reaching the rotary connector 10.

The steering column structure according to the above-described embodiment have been described. The present disclosure is not limited to the above-described embodiment, and various modifications and changes are possible based on the technical concept of the present disclosure.

For example, the first dam portion 25 is not required to extend along the periphery of the first insertion hole 24, and a linear first dam portion, for example, may be disposed in a position corresponding to the rotary connector 10 above the rotary connector. In this case, the first dam portion preferably has a length equivalent to the outer diameter of the rotary connector 10 and corresponding to the radial direction of the rotary connector. Also with this configuration, the liquid entering the gap 4 can be prevented from reaching the rotary connector 10.

In FIG. 7B, the steering lower cover 30 includes the protrusion portion 36a, and the steering column cover 20 includes the groove portion 25c. However, no such limitation is intended, and the steering lower cover 30 may include the groove portion, and the steering column cover 20 may include the protrusion portion. This configuration can also exhibit effect similar to the above-described effect.

What is claimed is:

1. A steering column structure comprising:
a rotary connector attached to an end portion of a steering shaft in a surrounding manner;
a steering column cover configured to house the end portion of the steering shaft; and
a steering lower cover configured to house a central portion of a steering wheel connected with the end portion of the steering shaft, the steering lower cover being attached with a gap defined between the steering lower cover and the steering column cover in an axial direction of the steering shaft,
the steering column cover comprising a first side wall portion defining the gap, and a first insertion hole disposed in the first side wall portion, the rotary connector being inserted into the first insertion hole,
the steering lower cover comprising a second side wall portion facing the first side wall portion and defining the gap together with the first side wall portion, and a second insertion hole disposed in the second side wall portion, the rotary connector being inserted into the second insertion hole,
at least one of the first side wall portion of the steering column cover and the second side wall portion of the steering lower cover comprising a first dam portion disposed in a position above the rotary connector and corresponding to the rotary connector,
wherein the first dam portion is a protrusion portion disposed on one of the first side wall portion and the second side wall portion and protruding toward the other of the first side wall portion and the second side wall portion, and
wherein the protrusion portion disposed on one of the first side wall portion and the second side wall portion is inserted into the first insertion hole or the second insertion hole of the other of the first side wall portion and the second side wall portion.

2. The steering column structure according to claim 1, wherein a length between end points of the first dam portion which extends along a periphery of the rotary connector is equivalent to a length of an outer diameter of the rotary connector.

3. The steering column structure according to claim 2, wherein the first dam portion is a groove portion disposed in one of the first side wall portion and the second side wall portion.

4. The steering column structure according to claim 1, wherein the first dam portion extends along a periphery of at least one of the first insertion hole and the second insertion hole.

5. The steering column structure according to claim 4, wherein the first dam portion is a groove portion disposed in one of the first side wall portion and the second side wall portion.

6. The steering column structure according to claim 1, wherein the first dam portion is a groove portion disposed in one of the first side wall portion and the second side wall portion.

7. The steering column structure according to claim 1, wherein:
the rotary connector comprises a stationary case and a rotary case rotatably joined to the stationary case, and is arranged so that the rotary case is positioned on a side closer to the steering wheel; and the rotary case comprises an upper end surface positioned on an upper side in the axial direction of the steering shaft with respect to the second side wall portion of the steering lower cover.

8. The steering column structure according to claim 7, wherein:
the rotary connector comprises a slide surface in an in-plane direction orthogonal to the axial direction of the rotary connector, the stationary case and the rotary case sliding on the slide surface; and
the slide surface is positioned on an upper side in the axial direction of the steering shaft with respect to the second side wall portion of the steering lower cover.

9. The steering column structure according to claim 7, wherein:
the rotary connector further comprises a rotary case post portion disposed on the upper end surface of the rotary case and adapted to be electrically connected with an external device; and
with the steering wheel in a neutral position, the rotary case post portion is in a 6 o'clock position on the rotary connector.

10. A steering column structure comprising:
a rotary connector attached to an end portion of a steering shaft in a surrounding manner;
a steering column cover configured to house the end portion of the steering shaft; and
a steering lower cover configured to house a central portion of a steering wheel connected with the end portion of the steering shaft, the steering lower cover being attached with a gap defined between the steering lower cover and the steering column cover in an axial direction of the steering shaft,
the steering column cover comprising a first side wall portion defining the gap, and a first insertion hole disposed in the first side wall portion, the rotary connector being inserted into the first insertion hole,
the steering lower cover comprising a second side wall portion facing the first side wall portion and defining the gap together with the first side wall portion, and a second insertion hole disposed in the second side wall portion, the rotary connector being inserted into the second insertion hole,
at least one of the first side wall portion of the steering column cover and the second side wall portion of the steering lower cover comprising a first dam portion disposed in a position above the rotary connector and corresponding to the rotary connector;
wherein the first dam portion extends along a periphery of at least one of the first insertion hole and the second insertion hole,
the first dam portion is a protrusion portion disposed on one of the first side wall portion and the second side wall portion and protruding toward the other of the first side wall portion and the second side wall portion, and
the protrusion portion disposed on one of the first side wall portion and the second side wall portion is inserted into the first insertion hole or the second insertion hole of the other of the first side wall portion and the second side wall portion.

11. A steering column structure comprising:
a rotary connector attached to an end portion of a steering shaft in a surrounding manner;
a steering column cover configured to house the end portion of the steering shaft; and
a steering lower cover configured to house a central portion of a steering wheel connected with the end portion of the steering shaft, the steering lower cover being attached with a gap defined between the steering lower cover and the steering column cover in an axial direction of the steering shaft,
the steering column cover comprising a first side wall portion defining the gap, and a first insertion hole disposed in the first side wall portion, the rotary connector being inserted into the first insertion hole,
the steering lower cover comprising a second side wall portion facing the first side wall portion and defining the gap together with the first side wall portion, and a second insertion hole disposed in the second side wall portion, the rotary connector being inserted into the second insertion hole,
at least one of the first side wall portion of the steering column cover and the second side wall portion of the steering lower cover comprising a first dam portion disposed in a position above the rotary connector and corresponding to the rotary connector,
wherein
the rotary connector comprises a stationary case and a rotary case rotatably joined to the stationary case, and is arranged so that the rotary case is positioned on a side closer to the steering wheel, and
the rotary case comprises an upper end surface positioned on an upper side in the axial direction of the steering shaft with respect to the second side wall portion of the steering lower cover.

* * * * *